is011741723B2

United States Patent
Chen et al.

(10) Patent No.: US 11,741,723 B2
(45) Date of Patent: Aug. 29, 2023

(54) SYSTEM FOR PERFORMING INTERSECTION SCENARIO RETRIEVAL AND METHOD THEREOF

(71) Applicant: Honda Motor Co., Ltd., Tokyo (JP)

(72) Inventors: Yi-Ting Chen, Sunnyvale, CA (US); Nakul Agarwal, Santa Clara, CA (US); Behzad Dariush, San Ramon, CA (US); Ahmed Taha, Hyattsville, MD (US)

(73) Assignee: HONDA MOTOR CO., LTD., Tokyo (JP)

( * ) Notice: Subject to any disclaimer, the term of this patent is extended or adjusted under 35 U.S.C. 154(b) by 362 days.

(21) Appl. No.: 16/916,087

(22) Filed: Jun. 29, 2020

(65) Prior Publication Data

US 2021/0271898 A1 Sep. 2, 2021

Related U.S. Application Data

(60) Provisional application No. 62/982,230, filed on Feb. 27, 2020.

(51) Int. Cl.
*G06V 20/56* (2022.01)
*G06F 16/735* (2019.01)
*G06N 3/02* (2006.01)
*G06F 16/783* (2019.01)
(Continued)

(52) U.S. Cl.
CPC .......... *G06V 20/588* (2022.01); *G06F 16/732* (2019.01); *G06F 16/735* (2019.01);
(Continued)

(58) Field of Classification Search
CPC ........ G06V 20/56; G06V 10/82; G06V 10/84; G06V 20/49; G06V 20/58; G06V 20/588;
(Continued)

(56) References Cited

U.S. PATENT DOCUMENTS

2014/0369596 A1* 12/2014 Siskind .................. G06V 10/85
  382/158
2016/0140400 A1 5/2016 Chandraker et al.
(Continued)

FOREIGN PATENT DOCUMENTS

JP 2015184798 10/2015
JP 2019036826 3/2019
(Continued)

OTHER PUBLICATIONS

Narayanan et al, Dynamic Traffic Scene Classification with Space-Time Coherence, May 20, 2019, 2019 International Conference on Robotics and Automation, IEEE, p. 1-7. (Year: 2019).*
(Continued)

*Primary Examiner* — John Villecco
*Assistant Examiner* — Kathleen M Broughton
(74) *Attorney, Agent, or Firm* — Rankin, Hill & Clark LLP

(57) ABSTRACT

A system and method for performing intersection scenario retrieval that includes receiving a video stream of a surrounding environment of an ego vehicle. The system and method also include analyzing the video stream to trim the video stream into video clips of an intersection scene associated with the travel of the ego vehicle. The system and method additionally include annotating the ego vehicle, dynamic objects, and their motion paths that are included within the intersection scene with action units that describe an intersection scenario. The system and method further include retrieving at least one intersection scenario based on a query of an electronic dataset that stores a combination of action units to operably control a presentation of at least one intersection scenario video clip that includes the at least one intersection scenario.

20 Claims, 9 Drawing Sheets

(51) Int. Cl.
  *G06F 16/787* (2019.01)
  *G06F 16/738* (2019.01)
  *G06V 20/40* (2022.01)
  *G06V 20/58* (2022.01)
  *G06T 7/246* (2017.01)
  *G06F 16/732* (2019.01)
  *G06V 10/84* (2022.01)
  *G06V 10/82* (2022.01)

(52) U.S. Cl.
  CPC .......... *G06F 16/738* (2019.01); *G06F 16/787* (2019.01); *G06F 16/7837* (2019.01); *G06N 3/02* (2013.01); *G06T 7/246* (2017.01); *G06V 10/82* (2022.01); *G06V 10/84* (2022.01); *G06V 20/49* (2022.01); *G06V 20/56* (2022.01); *G06V 20/58* (2022.01); *G06T 2207/20084* (2013.01)

(58) Field of Classification Search
  CPC ..... G06V 20/44; G06F 16/732; G06F 16/735; G06F 16/738; G06F 16/7837; G06F 16/787; G06N 3/02; G06N 3/0454; G06T 7/246; G06T 2207/20084
  USPC .......................................................... 382/103
  See application file for complete search history.

(56) References Cited

U.S. PATENT DOCUMENTS

| | | | | |
|---|---|---|---|---|
| 2018/0373980 | A1* | 12/2018 | Huval | G06F 18/41 |
| 2019/0205667 | A1* | 7/2019 | Avidan | G08G 1/165 |
| 2020/0160699 | A1* | 5/2020 | Annapureddy | G06V 20/56 |
| 2023/0154195 | A1* | 5/2023 | Agarwal | G06V 20/58 |
| | | | | 382/103 |

FOREIGN PATENT DOCUMENTS

| | | | | |
|---|---|---|---|---|
| JP | 2019214318 | | 12/2019 | |
| WO | WO-2015141523 A1 * | | 9/2015 | G06F 17/2881 |

OTHER PUBLICATIONS

Lin et al, Visual Semantic Search: Retrieving Videos via Complex Textual Queries, 2014, IEEE Conference on Computer Vision and Pattern Recognition, 2658-2666 (Year: 2014).*

Gao et al, Goal-oriented Object Importance Estimation in On-road Driving Videos, 2019, International Conference on Robotics and Automation, 5509-5515 (Year: 2019).*

Wang et al, Retrieval Topic Recurrent Memory Network for Remote Sensing Image Captioning, 2020, IEEE J. Appl. Earth Observations and Remote Sensing, vol. 13, pp. 256-270. (Year: 2020).*

Matsushita, Takeshi, and other four authors, Traffic Statistics and Event Analysis based on Image Sequence with User Interface, Technical report of The Institute of Electronics, Information and Communication Engineers (IEICE), Japan, Institute of Electronics, Information and Communication Engineers, Mar. 7, 2003, 102(708), 105-110 (Abstract only and English translation of Abstract).

Japanese Office Action of JP Serial No. 2021-018622 dated Jan. 18, 2022, 2 pages.

* cited by examiner

SYSTEM FOR PERFORMING INTERSECTION SCENARIO RETRIEVAL AND METHOD THEREOF

CROSS-REFERENCE TO RELATED APPLICATION

This application claims priority to U.S. Provisional Application Ser. No. 62/982,230 filed on Feb. 27, 2020, which is expressly incorporated herein by reference.

BACKGROUND

In computer image analysis, a common task is to classify and label objects and their motions in a captured video. Most existing systems take a finite set of object labels, which are learned offline from training data. This is inefficient and data intensive.

BRIEF DESCRIPTION

According to one aspect, a computer-implemented method for performing intersection scenario retrieval that includes receiving a video stream of a surrounding environment of an ego vehicle. The computer-implemented method also includes analyzing the video stream to trim the video stream into video clips of an intersection scene associated with the travel of the ego vehicle. The computer-implemented method also includes annotating the ego vehicle, dynamic objects, and their motion paths that are included within the intersection scene with action units that describe an intersection scenario. The action units include action unit nouns that describe the ego vehicle and the dynamic objects and action unit verbs that describe respective motion paths of the ego vehicle and the dynamic objects within the intersection scene. The computer-implemented method further includes retrieving at least one intersection scenario based on a query of an electronic dataset that stores a combination of action units to operably control a presentation of at least one intersection scenario video clip that includes the at least one intersection scenario.

According to another aspect, a system for performing intersection scenario retrieval that includes a memory storing instructions when executed by a processor cause the processor to receive a video stream of a surrounding environment of an ego vehicle. The instructions also cause the processor to analyze the video stream to trim the video stream into video clips of an intersection scene associated with the travel of the ego vehicle. The instructions additionally cause the processor to annotate the ego vehicle, dynamic objects, and their motion paths that are included within the intersection scene with action units that describe an intersection scenario. The action units include action unit nouns that describe the ego vehicle and the dynamic objects and action unit verbs that describe respective motion paths of the ego vehicle and the dynamic objects within the intersection scene. The instructions further cause the processor to retrieve at least one intersection scenario based on a query of an electronic dataset that stores a combination of action units to operably control a presentation of at least one intersection scenario video clip that includes the at least one intersection scenario.

According to yet another aspect, a non-transitory computer readable storage medium storing instructions that when executed by a computer, which includes a processor perform a method that includes receiving a video stream of a surrounding environment of an ego vehicle. The method also includes analyzing the video stream to trim the video stream into video clips of an intersection scene associated with the travel of the ego vehicle. The method also includes annotating the ego vehicle, dynamic objects, and their motion paths that are included within the intersection scene with action units that describe an intersection scenario. The action units include action unit nouns that describe the ego vehicle and the dynamic objects and action unit verbs that describe respective motion paths of the ego vehicle and the dynamic objects within the intersection scene. The method further includes retrieving at least one intersection scenario based on a query of an electronic dataset that stores a combination of action units to operably control a presentation of at least one intersection scenario video clip that includes the at least one intersection scenario.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
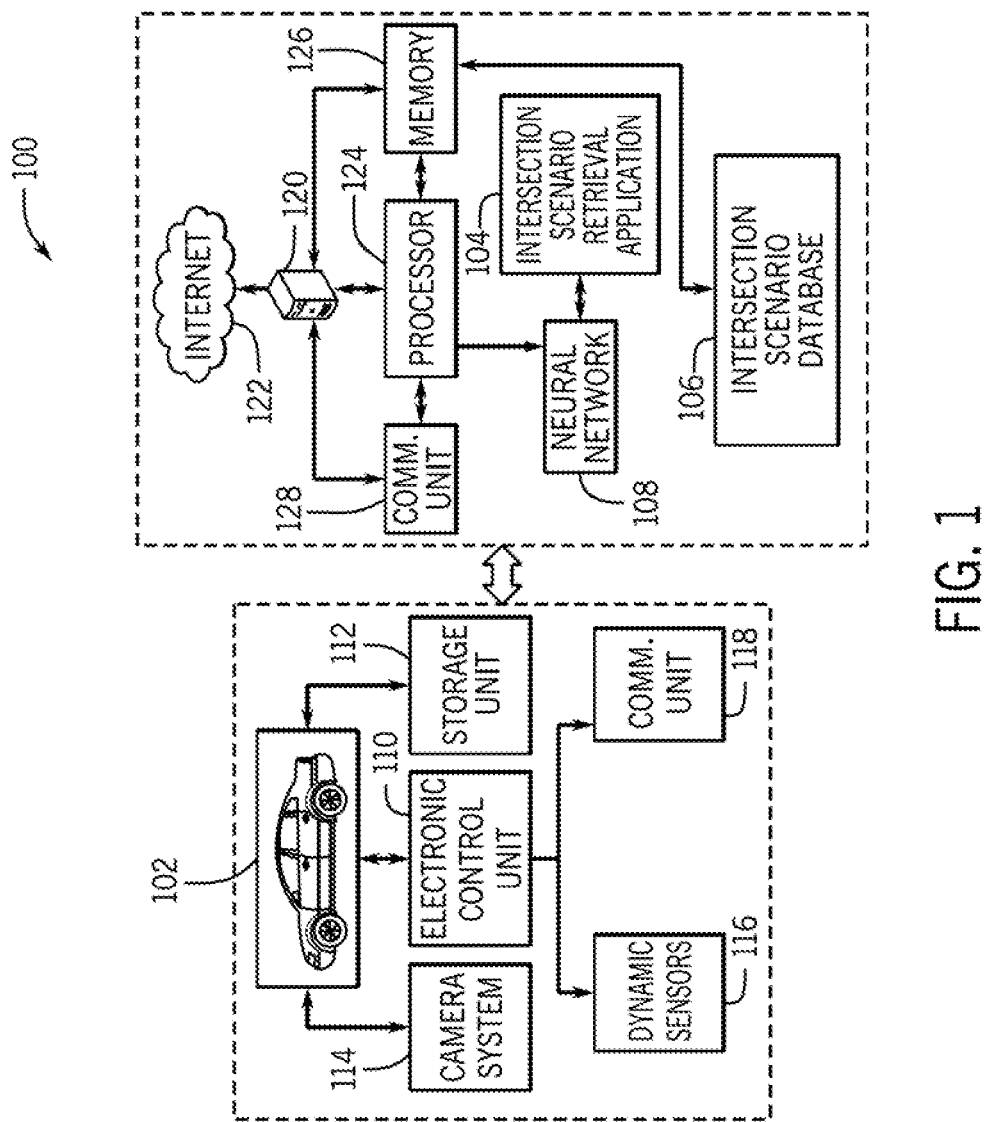
FIG. 1 is a schematic view of an exemplary system for performing intersection scenario retrieval according to an exemplary embodiment of the present disclosure.

The following includes definitions of selected terms employed herein. The definitions include various examples and/or forms of components that fall within the scope of a term and that may be used for implementation. The examples are not intended to be limiting.

A "bus", as used herein, refers to an interconnected architecture that is operably connected to other computer components inside a computer or between computers. The bus may transfer data between the computer components. The bus may be a memory bus, a memory controller, a peripheral bus, an external bus, a crossbar switch, and/or a local bus, among others. The bus may also be a vehicle bus that interconnects components inside a vehicle using protocols such as Media Oriented Systems Transport (MOST), Controller Area network (CAN), Local Interconnect Network (LIN), among others.

"Computer communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

A "disk", as used herein may be, for example, a magnetic disk drive, a solid state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

A "memory", as used herein may include volatile memory and/or non-volatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM). The memory may store an operating system that controls or allocates resources of a computing device.

A "module", as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

An "operable connection", or a connection by which entities are "operably connected", is one in which signals, physical communications, and/or logical communications may be sent and/or received. An operable connection may include a wireless interface, a physical interface, a data interface and/or an electrical interface.

A "processor", as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, go-karts, amusement ride cars, rail transport, personal watercraft, and aircraft. In some cases, a motor vehicle includes one or more engines. Further, the term "vehicle" may refer to an electric vehicle (EV) that is capable of carrying one or more human occupants and is powered entirely or partially by one or more electric motors powered by an electric battery. The EV may include battery electric vehicles (BEV) and plug-in hybrid electric vehicles (PHEV). The term "vehicle" may also refer to an autonomous vehicle and/or self-driving vehicle powered by any form of energy. The autonomous vehicle may or may not carry one or more human occupants. Further, the term "vehicle" may include vehicles that are automated or non-automated with pre-determined paths or free-moving vehicles.

A "value" and "level", as used herein may include, but is not limited to, a numerical or other kind of value or level such as a percentage, a non-numerical value, a discrete state, a discrete value, a continuous value, among others. The term "value of X" or "level of X" as used throughout this detailed description and in the claims refers to any numerical or other kind of value for distinguishing between two or more states of X. For example, in some cases, the value or level of X may be given as a percentage between 0% and 100%. In other cases, the value or level of X could be a value in the range between 1 and 10. In still other cases, the value or level of X may not be a numerical value, but could be associated with a given discrete state, such as "not X", "slightly x", "x", "very x" and "extremely x".

I. System Overview

Referring now to the drawings, wherein the showings are for purposes of illustrating one or more exemplary embodiments and not for purposes of limiting same, FIG. 1 is a schematic view of an exemplary system 100 for performing intersection scenario retrieval according to an exemplary embodiment of the present disclosure. The components of the system 100, as well as the components of other systems, hardware architectures, and software architectures discussed herein, may be combined, omitted, or organized into different architectures for various embodiments.

Generally the system 100 may include an ego vehicle 102. The ego vehicle 102 may include, but may not be limited to, an automobile, a robot, a forklift, a bicycle/motor bike, a wheel chair/scooter, a construction crane, an airplane, and the like that may be traveling within one or more types of environments. For purposes of simplicity, this disclosure will describe the embodiments of the system 100 with respect to an ego vehicle 102 as a passenger vehicle (e.g., car).

Figure 2:
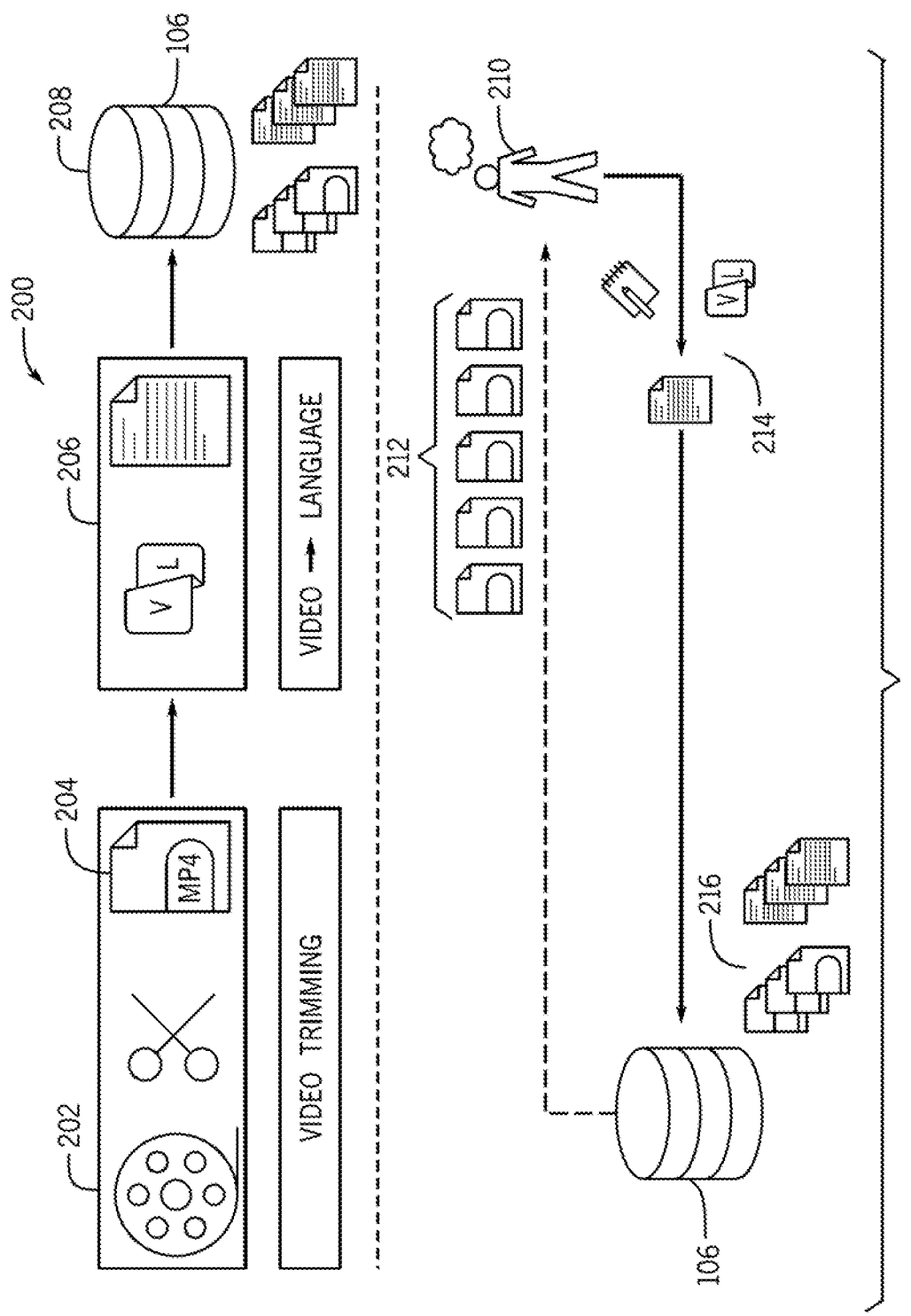
FIG. 2 is a general framework of an operation of the intersection scenario application according to an exemplary embodiment of the present disclosure.

In an exemplary embodiment, the system 100 may include an intersection scenario retrieval application 104 (intersection scenario application). With reference to FIG. 2, a general framework 200 of the operation of the intersection scenario application 104, the intersection scenario application 104 may be configured to receive one or more video streams 202 of a surrounding environment of the ego vehicle 102 (e.g., roadway environment in which the ego vehicle 102 is traveling). The intersection scenario application 104 may be further configured to analyze video from the one or more video streams 202 and/or dynamic data associated with the dynamic operation of the ego vehicle 102 to determine one or more portions of the one or more video streams 202 that include action priors that are associated with intersection scenes. In particular, the intersection scenario application 104 may be configured to electronically trim the one or more portions as video clips 204 that include action priors that are associated with various types of roadway intersections that are captured within the video streams 202 as intersection scenes.

More specifically, the one or more video clips 204 are trimmed from portions of respective video streams 202 that include captured egocentric video of the surrounding environment of the ego vehicle 102 as the ego vehicle 102 approaches, enters, passes through, and exits intersection scenes (e.g., that include roadway intersections). The one or more video clips 204 that include action priors pertaining to intersection scenes include dynamic objects, that may include, may not be limited to additional vehicles (referred herein simply as cars) that may be traveling within the intersection scenes, pedestrians that may be traveling within the intersection scenes, and/or cyclists (e.g., bicyclists/motorcyclists) that may traveling within the intersection scenes. In addition to the dynamic objects, the action priors pertain to the motion of each of the dynamic objects within the intersection scenes included within each of the video clips 204 during a timeframe in which the ego vehicle 102 is approaching, entering, passing through, and exiting each respective intersection scene. Such motion may include, but may not be limited to, stopping motions, turning motions, crossing motions, and the like.

In an exemplary embodiment, the intersection scenario application 104 may be configured to utilize a neural network 108 to analyze the action priors included within video clips 204 of the intersection scenes in addition to the dynamic operation of the ego vehicle 102 to thereby annotate 206 the objects and motion paths of the ego vehicle 102 and the dynamic objects with respect to their respective descriptions and their traveling maneuvers within each intersection scene as action units. As discussed in more detail below, the action units may be combined to form the video true traffic language to succinctly and distinctly describe intersection scenarios of each of the respective intersection scenes in noun-verb combinations that pertain to the ego vehicle 102 and the one or more dynamic objects included within each respective intersection scene and their respective motion pathways within each intersection scene. Action unit nouns of the video true traffic language may describe the ego vehicle 102 and one or more dynamic objects that are located within each intersection scene. Such dynamic objects described may include a car, a group of cars, a pedestrian, a group of pedestrians, a cyclist (bicyclist, motorcyclist), a group of cyclists, and the like. It is to be appreciated that additional contemplated dynamic objects that are not explicitly discussed herein may be described by action unit nouns.

The video true traffic language may also include action unit verbs that are combined with the action unit nouns. The action unit verbs are directed towards the ego vehicle's motion path (e.g., path of travel) within the intersection scenes and each respective dynamic object's respective motion paths within intersection scenes. Accordingly, the action unit verbs may be combined with the action unit nouns describing the respective motion paths of the ego vehicle 102 and the dynamic objects (e.g., ego vehicle, car, pedestrian, cyclist) within each respective intersection scene included within each of the video clips 204. Accordingly, the action units may include rich spatial information regarding each of the intersection scenes in order to describe the ego vehicle 102, the dynamic objects, and their respective motion paths within the respective intersection scenes to help conceptualize three-dimensional relationships of the ego vehicle 102 and the dynamic objects included within intersection scenes in space as a succession of transformations over a period of time.

In one embodiment, upon annotating the ego vehicle 102, the dynamic objects, and their respective motion paths included within each of respective intersection scene with respective action units, the intersection scenario application 104 may be configured to combine respective action units associated with particular objects (e.g., ego vehicle 102, cars, pedestrians, cyclists) to their respective motion paths (e.g., turning, stopping, accelerating, crossing).

The intersection scenario application 104 may be further configured to store a dataset of combined action units that are associated with a plurality of intersection scenes. The combined action units may be classified as intersection scenarios and linked with previously captured video clips 204 of the intersection scenes that include the ego vehicle 102 and one or more types of dynamic objects completing one or more types of motion paths (e.g., left turn, right turn, traveling straight through the intersection).

The intersection scenarios may be stored 208 upon an intersection scenario database 106 as a dataset of combined action units that are associated with a plurality of intersection scenes. In an exemplary embodiment, in a search mode of the application 104, the intersection scenario application 104 may provide a user 210 with the ability to retrieve one or more particular intersection scenario video clips 212 that are associated with a particular intersection scenario based on input of object and motion search inputs 214 that are provided by the user 210.

The intersection scenario application 104 may be configured to query 216 the intersection scenario database 106 with one or more combinations of action units to retrieve records of respective action units that may be stored upon the intersection scenario database 106. Accordingly, the application 104 may be configured to operably control a graphical user interface provided through one or more display screens (not shown) to present one or more linked stored intersection scenario video clips 212 of one or more intersection scenarios that fulfill the query 216 of the combinations of action units.

With particular reference to FIG. 1, the ego vehicle 102 may include an electronic control device (ECU) 110 that operably controls a plurality of components of the ego vehicle 102. The ECU 110 may be configured to execute one or more applications, operating systems, vehicle system and subsystem executable instructions, among others. In one or more embodiments, the ECU 110 may include a respective microprocessor, one or more application-specific integrated circuit(s) (ASIC), or other similar devices. The ECU 110 may also include a respective internal processing memory, an interface circuit, and bus lines for transferring data, sending commands, and communicating with the plurality of components of the ego vehicle 102.

The ECU 110 may also include a respective communication device (not shown) for sending data internally to components of the ego vehicle 102 and communicating with externally hosted computing systems (e.g., external to the ego vehicle 102. Generally, the ECU 110 may communicate with a storage unit 112 to execute the one or more applications, operating systems, vehicle systems and subsystem user interfaces, and the like that are stored upon the storage unit 112. The storage unit 112 of the ego vehicle 102 may also be configured to store one or more executable files associated with one or more operating systems, applications, associated operating system data, application data, vehicle system and subsystem user interface data, and the like that are executed by the ECU 110.

In one or more embodiments, the storage unit 112 may be accessed by the intersection scenario application 104 to store data, for example, one or more video streams 202 and/or vehicle dynamic data associated with the ego vehicle 102. As discussed below, such data may be utilized to trim video clips 204 of respective videos streams 202 that include action priors that include dynamic objects and the respective motions of the dynamic objects within respective intersection scenes.

In an exemplary embodiment, the ECU 110 may be additionally configured to operably control a camera system 114 of the ego vehicle 102. The camera system 114 may include one or more cameras (not shown) that are positioned at one or more exterior portions of the ego vehicle 102. The one or more cameras of the camera system 114 may be positioned in a direction to capture an egocentric view of the surrounding environment of the ego vehicle 102. In other words, the one or more cameras may be positioned in a direction to capture a predetermined area located around (front and sides) of the ego vehicle 102 as it is traveling within the surrounding environment of the ego vehicle 102.

In one or more configurations, the one or more cameras of the camera system 114 may be disposed at external front, rear, and/or side portions of the ego vehicle 102 including, but not limited to different portions of the bumpers, lighting units, fenders/body panels, and/or windshields. The one or more cameras may be positioned on a respective planar sweep pedestal (not shown) that allows the one or more cameras to be oscillated to capture video of the surrounding environment of the ego vehicle 102. Accordingly, when the ego vehicle 102 travels through one or more intersections, the one or more cameras are configured to capture a full/panned egocentric view of all of the streets of the intersections included within the surrounding environment of the ego vehicle 102.

In an exemplary embodiment, the intersection scenario application 104 may be configured to receive video streams 202 of untrimmed video from the camera system 114. The video streams 202 may include egocentric views of the surrounding environment of the ego vehicle 102 captured during a predetermined timeframe (e.g., 500 hours). As discussed below, the intersection scenario application 104 may utilize the neural network 108 to execute image logic to analyze the video streams 202 of the surrounding environment of the ego vehicle 102 during the predetermined timeframe to determine one or more intersection scenes that are included within the video streams 202. As discussed, the video streams 202 may be trimmed to video clips 204 and the video clips 204 may be analyzed to annotate the intersection scenes with the video true traffic language that uses action unit nouns that are directed towards describing the dynamic objects and action unit verbs that are directed towards each dynamic object's respective motion path within the intersection scenes included within the video clips 204.

In an exemplary embodiment, the ECU 110 may also be operably connected to dynamic sensors 116 of the ego vehicle 102. The dynamic sensors 116 may be configured to output sensed dynamic data associated with the ego vehicle 102. In one embodiment, the dynamic sensors 116 may be configured to receive inputs from one or more vehicle systems, sub-systems, control systems, and the like. The dynamic sensors 116 may be included as part of a Controller Area Network (CAN) of the ego vehicle 102 and may be configured to provide vehicle dynamic data to the ECU 110 to be utilized for one or more vehicle systems, sub-systems, control systems, and the like.

The dynamic sensors 116 may include, but may not be limited to, position sensors, heading sensors, speed sensors, steering speed sensors, steering angle sensors, throttle angle sensors, accelerometers, magnetometers, gyroscopes, yaw rate sensors, brake force sensors, wheel speed sensors, wheel turning angle sensors, transmission gear sensors, temperature sensors, RPM sensors, GPS/DGPS sensors, and the like (individual sensors not shown). In one or more embodiments, the dynamic sensors 116 may output sensed dynamic data that may include data associated with the dynamic operation of the ego vehicle 102 that is captured at concurrent time stamps as respective video streams that are captured by the one or more cameras of the camera system 114.

In one embodiment, the intersection scenario application 104 may configured to receive the sensed dynamic data from the dynamic sensors 116. The intersection scenario application 104 may be configured to utilize the neural network 108 to execute sensor logic to determine one or more dynamic actions that may be associated with dynamic operations of the ego vehicle 102 at instances when the ego vehicle 102 approaches, enters, passes through, and/or exits each intersection scene included within the video stream 202. The one or more dynamic actions may include, but may not be limited to, braking at one or more predetermined braking rates, stopping for one or more predetermined periods of time, steering at one or more steering angles that may indicate merging and/or turning right/left, accelerating after a braking event, and the like. In other words, the dynamic data associated with the dynamic operation of the ego vehicle 102 may be analyzed by the intersection scenario application 104 to determine instances when the ego vehicle 102 approaches, enters, passes through, and/or exits intersection scenes.

As discussed below, upon the neural network 108 determining one or more dynamic actions that may associated with dynamic operations of the ego vehicle 102 when the ego vehicle approaches, enters, passes through, and/or exits each intersection scene, the intersection scenario application 104 may determine portions of the video streams 202 of the surrounding environment of the ego vehicle 102 that include the one or more dynamic actions that were concurrently sensed by the dynamic sensors 116. The intersection scenario application 104 may thereby trim the video streams 202 to include the respective portions of the video streams to include intersection scenes that are determined based on the dynamic data of the dynamic sensors 116. The video clips 204 of the intersection scenes may be further analyzed to annotate the ego vehicle 102, one or more dynamic objects, and their respective motion paths within the intersection scenes with the video true traffic language.

With particular reference to the video true traffic language, in an exemplary embodiment, the action unit nouns of the video true traffic language may include, but may not be limited to, E to indicate the ego vehicle 102 traveling within the intersection scene, C to indicate a car (e.g., another vehicle) traveling within the intersection scene, C+ to indicate a group of cars traveling within the intersection scene, P to indicate a pedestrian traveling within the intersection scene, P+ to indicate a group of pedestrians traveling within the intersection scene, K to indicate a bicyclist traveling within the intersection scene, and K+ to indicate a group of bicyclists traveling within the intersection scene.

In one or more embodiments, the one or more dynamic actions of the ego vehicle 102 at each respective intersection scene may be utilized to annotate motions associated with the ego vehicle 102 as action unit verbs of the video true traffic language. The application 104 may analyze the one or more dynamic actions of the ego vehicle 102 as the ego vehicle 102 approaches, enters, passes through, and exits each respective intersection scene such as turning, merging, traveling straight, and the like to annotate the motion paths of the ego vehicle 102 that pertain to a starting point and ending point of a path of travel of the ego vehicle 102 within each respective intersection scene. Accordingly, the ego vehicle's dynamic actions within the intersection scene may be described by action units that are included as action unit verbs that are combined with the action unit noun 'E' describing the ego vehicle 102 as a subject object. Similarly the dynamic objects (C, C+, P, P+, K, K+) that have been annotated with action unit nouns may be also be combined with action unit verbs that pertain the motion paths of the respective dynamic objects. The motion paths may be indicated by a starting point and ending point of a path of travel for each dynamic object within each respective intersection scene.

Figure 3A:
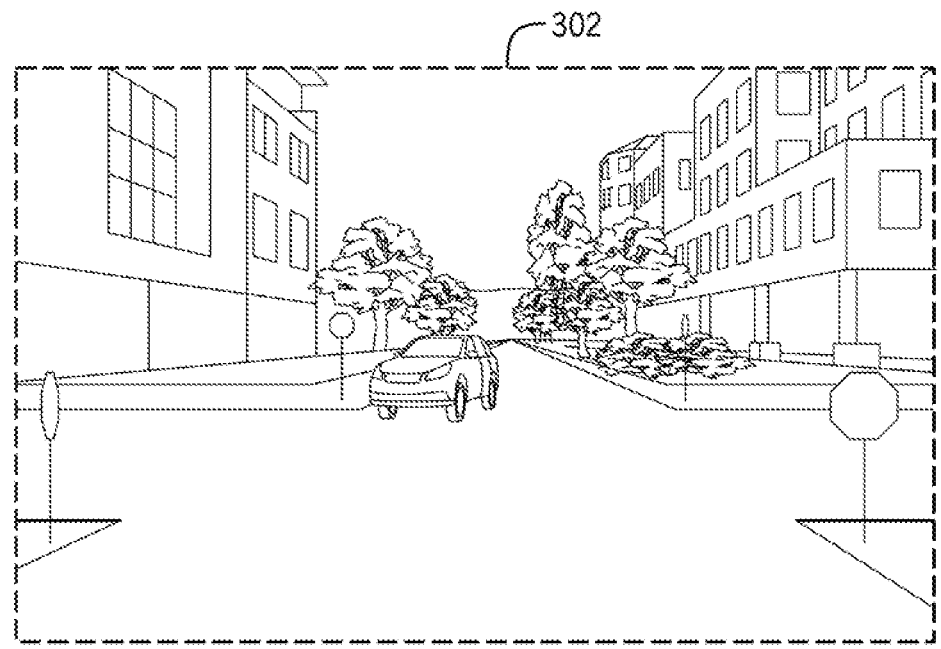
FIG. 3A is as an illustrative example of an intersection scene that may be included within a video clip trimmed from a video stream according to an exemplary embodiment of the present disclosure.
Figure 3B:
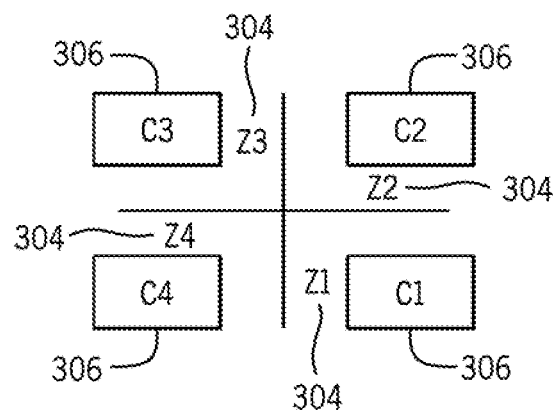
FIG. 3B is an illustrative example of a video true traffic language may pertain to zones and corners of the intersection scene according to an exemplary embodiment of the present disclosure.

With reference to FIG. 3A, an illustrative example of an intersection scene 302 may be included within a video clip 204 that is trimmed from a video stream 202. As shown, the intersection scene 302 may be configured as a four-way roadway intersection. As shown in FIG. 3B, the video true traffic language may pertain to zones 304 and corners 306 of the intersection scene 302. The zones 304 may be indicated by the Z1-Z4 action units. The corners 306 may be indicated by the C1-C4 action units. The action unit verbs may pertain to motions of the each respective subject dynamic object with respect to the motion of the dynamic object through respective zones 304 and/or respective corners 306 of the intersection scene 302. The motions of the ego vehicle 102 and the annotated dynamic objects (C, C+, P, P+, K, K+) that are included within the intersection scene 302 are annotated with action unit verbs that pertain to the motions between the zones 304 (e.g., straight driving) and/or between the corners 306 (e.g., turning from one street to another) of the intersection scene 302.

As discussed, the action unit nouns describing the ego vehicle 102 and the dynamic objects within the intersection scene 302 may be combined with the action unit verbs associated with the motion paths of the ego vehicle 102 and the respective dynamic objects to describe each respective intersection scenario. Accordingly, the motion paths of the ego vehicle 102 and the dynamic objects may be mapped according to their respective starting position to their final position within the intersection scene 302. For example, if a group of pedestrians walk from a far right corner to near a right corner on the intersection scene 302 while the ego vehicle 102 passes the intersection scene 302 and slows down to allow a pedestrian to cross a roadway of the intersection scene 302, this scenario may be described as an intersection scenario using the annotated combined action units. Such an intersection scenario may be annotated using the video true traffic language as:

(1) P+: C1→C2
(2) P: C2→C3
(3) E: Z1→Z3

Accordingly, the action units may be combined to succinctly and distinctly describe the intersection scenario of the respective intersection scene 302 in noun-verb combinations that pertain to the ego vehicle 102 and the dynamic objects included within each respective intersection scene 302 included within each of the video clips 204. The succinct and distinct description of the intersection scenario allows for efficient retrieval (e.g., time efficient, less processing power) of the intersection scenario during a search mode of the application 104.

Referring again to FIG. 1, in an exemplary embodiment, the ECU 110 of the ego vehicle 102 may be operably connected to a communication unit 118. The communication unit 118 may be configured to connect to an internet cloud 122 to send and receive communication signals to and from an externally hosted server infrastructure (external server) 120. The external server 120 may host the neural network 108 and may execute the intersection scenario application 104 to utilize processing power to execute image logic, sensor logic, and to annotate the ego vehicle 102, dynamic objects, and their respective motion paths that are included within intersection scenes captured within respective video clips 204 with respective action unit nouns and action unit verbs.

The external server 120 may be operably controlled by a processor 124. The processor 124 may be configured to operably control the neural network 108 to utilize machine learning/deep learning to provide artificial intelligence capabilities that may be utilized to annotate the dynamic objects and their respective motion paths included within each respective intersection scene 302. In one configuration, the neural network 108 may be configured as a convolutional neural network (CNN) model that is trained for video classification. The neural network 108 may include multiple multilayer perceptron (MLPs) (shown in FIG. 6) that may be configured to process streams of data associated with the video streams 202, video clips 204, and dynamic data provided by the dynamic sensors 116 of the ego vehicle 102.

The neural network 108 may also include one or more additional neural networks (not shown) that process data associated with the trimmed video streams. For example, the neural network 108 may include a graph convolutional network that may include an input layer to receive data associated with each dynamic object located within each intersection scene 302. Such data may be associated with the ego vehicle 102, one or more cars, one or more pedestrians, and/or one or more cyclists that are traveling within each intersection scene. The graph convolutional layer may be configured to include a plurality of hidden layers that analyze vector values to thereby output a relationship between the ego vehicle 102 and additional dynamic objects located within the intersections scenes 302 with respect to one another.

As discussed below, the neural network 108 may be configured to access a pre-trained dataset (not shown) to fuse streams of data associated with the relationships of the dynamic objects, the motions of the dynamic objects, and a context of the intersections scenes 302 to thereby annotate dynamic objects and motions that are included within respective intersection scenes 302 captured within video clips 204 with respective noun action units and verb action units. As discussed below, the intersection scenario application 104 may be configured to receive the annotated action units as combined action units that pair the ego vehicle 102 and the dynamic objects with their respective motion paths that occur within each respective intersection scene 302.

With continued reference to the external server 120 shown in FIG. 1, the processor 124 may be operably connected to a memory 126. The memory 126 may store one or more operating systems, applications, associated operating system data, application data, executable data, and the like. In one embodiment, the memory 126 may store the intersection scenario database 106. In an exemplary embodiment, the intersection scenario database 106 may be configured as a relational database that includes fields that pertain to various types of intersection configurations. Such configurations may include, but may not be limited to, n-way intersection scenarios (e.g., four-way intersection, three-way intersection), traffic circles, merge ramp intersections, and the like.

Figure 3C:
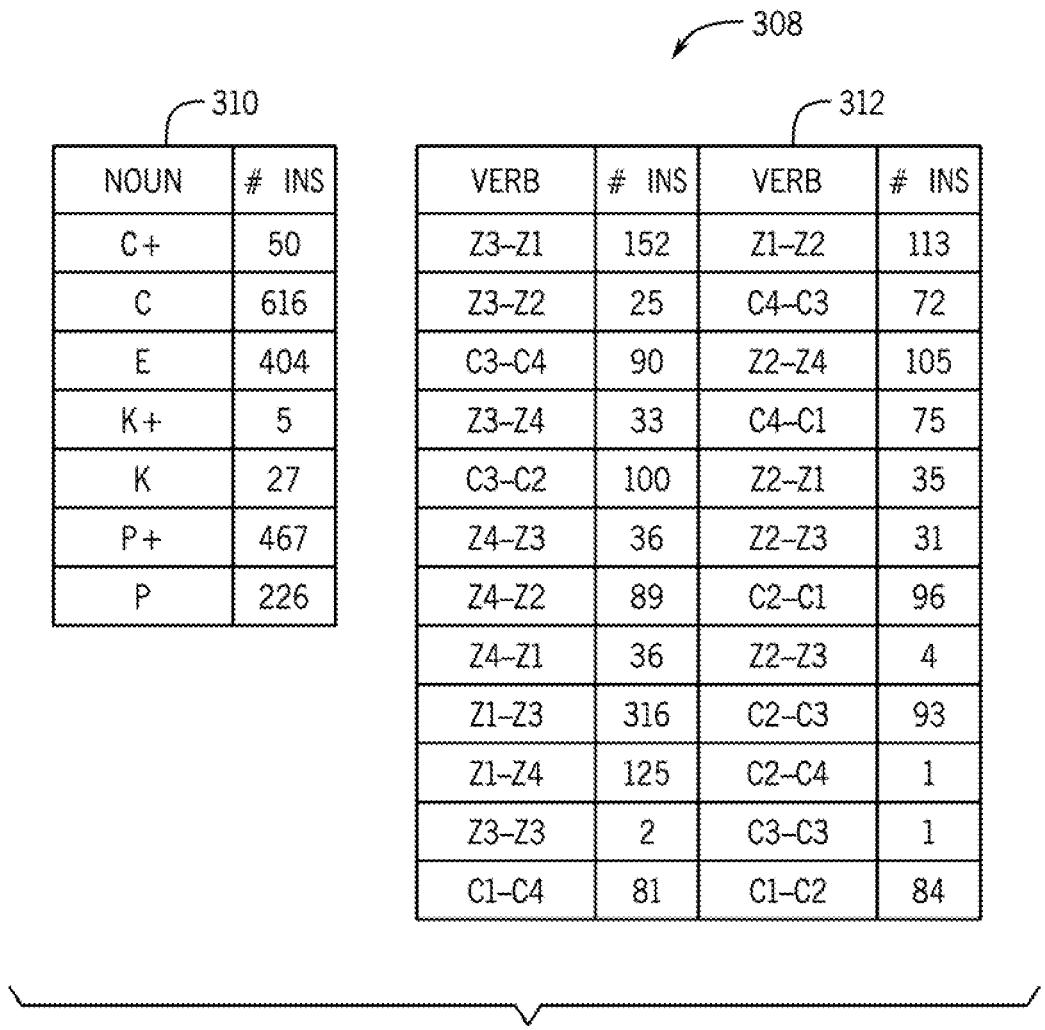
FIG. 3C is an illustrative example of a dataset of action units that are associated with a plurality of intersection scenes as intersection scenarios according to an exemplary embodiment of the present disclosure.

With reference to an illustrative example of FIG. 3C, the intersection scenario application 104 may be further configured to store a dataset 308 of action units that are associated with a plurality of intersection scenes 302 as intersection scenarios. The dataset 308 may include a subset of action unit nouns 310 that pertain to the ego vehicle 102 and the dynamic objects traveling within each respective intersection scene 302. The dataset 308 may also include a subset of action unit verbs 312 that pertain to the respective motions of the ego vehicle 102 and the dynamic objects included within each respective intersection scene 302. In one embodiment, respective action units of the subsets may be combined and stored upon the intersection scenario database 106 and linked with one or more video clips 204 of the respective intersection scenario associated with the combination of action units.

In particular, each of the fields of the intersection scenario database 106 may be organized based on a type of intersection configuration (e.g., four way intersection, three way intersection, etc.) and may include respective data records that pertain to intersection scenarios that pertain to the type of intersection configuration. Each of the respective data records may be populated with respective intersection scenarios that may include one or more action unit combinations that are associated with respective intersection scenes. As discussed below, during a search mode of the application 104, the intersection scenario application 104 may query 216 the intersection scenario database to provide the user 210 with the ability to retrieve one or more particular intersection scenario video clips 212 based on input of object and motion search inputs 214 that are provided by the user 210.

In one embodiment, the memory 126 may also be configured to store a plurality of video clips 204 that are respectively associated with the intersection scenarios stored upon the intersection scenario database 106. During the search mode of the application 104, upon querying 216 the intersection scenario database 106 with the object and motion search inputs 214, the application 104 may be configured to access the memory 126 to retrieve one or more of the plurality of video clips 204 that are stored upon the memory 126. The application 104 may be configured to present the one or more stored video clips 204 as one or more particular intersection scenario video clips 212 based on combinations of action units that pertain to the object and motion search inputs 214 provided by the user 210 during the search mode of the application 104.

With continued reference to FIG. 1, in one embodiment, the processor 124 of the external server 120 may additionally be configured to communicate with a communication unit 128. The communication unit 128 may be configured to communicate through the internet cloud 122 through one or more wireless communication signals that may include, but may not be limited to Bluetooth® signals, Wi-Fi signals, ZigBee signals, Wi-Max signals, and the like. In one embodiment, the communication unit 128 may be configured to connect to the internet cloud 122 to send and receive communication signals to and from the ego vehicle 102. In particular, the external server 120 may receive data associated with videos captured by the one or more cameras of the camera system 114 and dynamic data captured by the dynamic sensors 116 of the ego vehicle 102.

II. The Intersection Scenario Retrieval Application and Related Methods

The components of the intersection scenario application 104 will now be described according to an exemplary embodiment and with reference to FIG. 1. In an exemplary embodiment, the intersection scenario application 104 may be stored on the memory 126 and executed by the processor 124 of the external server 120. In another embodiment, the intersection scenario application 104 may be stored on the storage unit 112 of the ego vehicle 102 and may be executed by the ECU 110.

Figure 4:
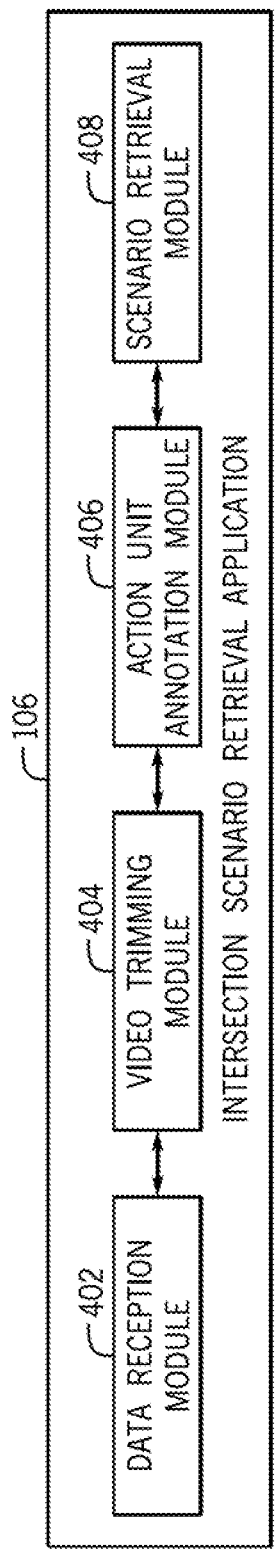
FIG. 4 is a schematic overview of a plurality of modules of the intersection scenario application that may execute computer implemented instructions to perform intersection scenario storage and retrieval according to an exemplary embodiment of the present disclosure.

The general functionality of the intersection scenario application 104 will now be discussed. With reference to FIG. 4, the intersection scenario application 104 may include a plurality of modules 402-408 that may execute computer implemented instructions to perform intersection scenario storage and retrieval. The plurality of modules 402-408 may include a data reception module 402, a video trimming module 404, an action unit annotation module 406, and a scenario retrieval module 408. It is to be appreciated that the intersection scenario application 104 may include one or more additional modules and/or sub-modules that are included in addition to the modules 402-408. Methods and examples describing process steps that are executed by the modules 402-408 of the intersection scenario application 104 will now be described in more detail.

Figure 5:
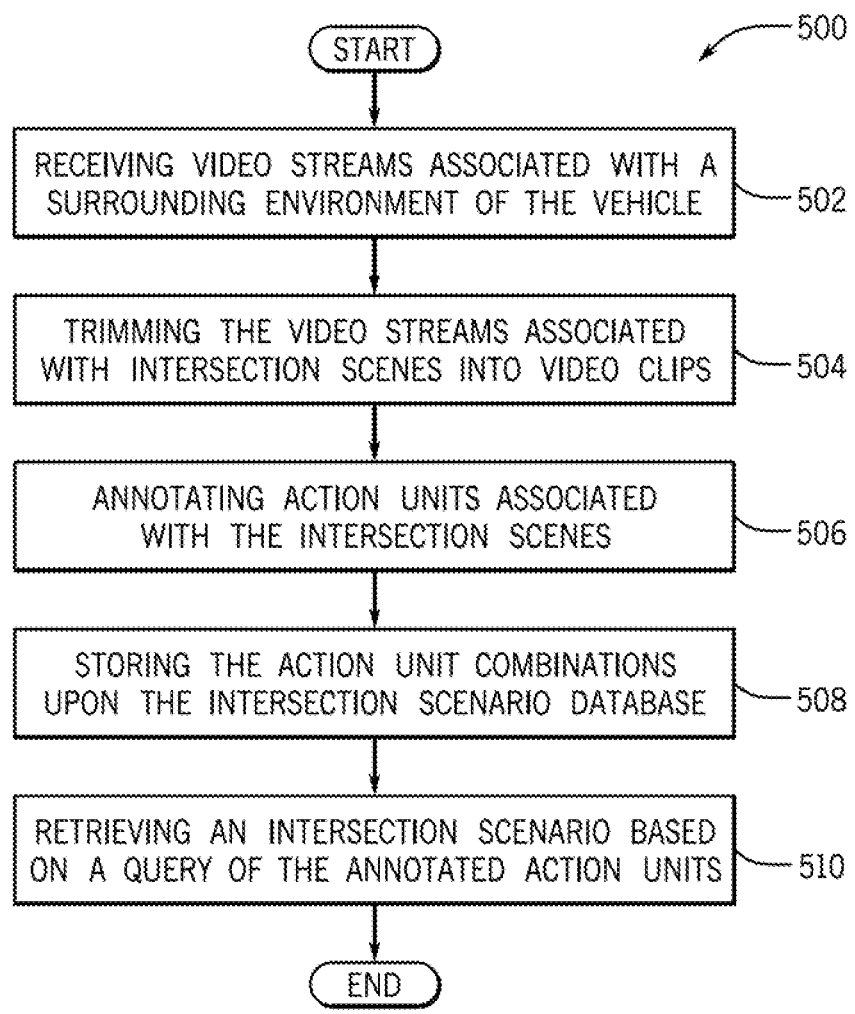
FIG. 5 is a process flow diagram of a method for annotating action units associated with intersection scenes and retrieving an intersection scenario according to an exemplary embodiment of the present disclosure.

FIG. 5 is a process flow diagram of a method 500 for annotating action units associated with intersection scenes 302 and retrieving an intersection scenario according to an exemplary embodiment of the present disclosure. FIG. 5 will be described with reference to the components of FIG. 1-FIG. 4, though it is to be appreciated that the method 500 of FIG. 5 may be used with additional and/or alternative system components. The method 500 may begin at block 502, wherein the method 500 may include receiving video streams 202 associated with intersection scenes 302.

In an exemplary embodiment, the data reception module 402 of the intersection scenario application 104 may be configured to communicate with the camera system 114 to receive video streams 202 of the surrounding environment of the ego vehicle 102. As discussed above, one or more cameras of the camera system 114 may be configured to capture the egocentric view of the surrounding environment of the ego vehicle 102. The data reception module 402 may be configured to receive video streams 202 of the untrimmed video captured of a predetermined time frame of the egocentric view of the surrounding environment of the ego vehicle 102.

The method 500 may proceed to block 504, wherein the method 500 may include trimming the video streams 202 associated with intersection scenes into video clips 204. In an exemplary embodiment, upon receiving the video streams, the data reception module 402 may communicate respective video image data associated with the video streams to the video trimming module 404 of the intersection scenario retrieval application 104. In an exemplary embodiment, the video trimming module 404 may be configured to communicate with the neural network 108 hosted upon the external server 120. The video trimming module 404 may utilize the neural network 108 to execute image logic to analyze the video image data associated with the video streams. The image logic may be based on a pre-trained image classification dataset that may be accessed by the neural network for video classification to identify intersection scenes and trim the video streams 202 into video clips 204 that include intersection scenes 302.

In particular, the neural network 108 may be configured to trim one or more video clips 204 from the video streams 202 that include action priors that pertain the surrounding environment of the ego vehicle 102 that includes intersection scenes 302. In other words, the video clips 204 are trimmed from portions of respective video streams 202 that include captured video of ego vehicle 102 approaching, entering, passing through, and exiting intersection scenes 302. The action priors included within the video clips 204 may include dynamic objects, that may include, may not be limited to cars that may be included within the intersection scenes 302, pedestrians that may be included within the intersection scenes 302, and/or cyclists (e.g., bicyclists/motorcyclists) that may be included within the intersection scenes 302. In addition to the dynamic objects, the action priors included within the video clips 204 may pertain to the motion paths of each of the dynamic objects within the intersection scenes 302 included within each of the video clips 204 during a timeframe in which the ego vehicle 102 is approaching, entering, passing through, and exiting each respective intersection scene 302. Such motion may include, but may not be limited to, stopping motions, turning motions, crossing motions, and the like.

Upon trimming the video clips 204 that include the action priors, the neural network 108 may communicate respective data associated with the video clips 204 to the video trimming module 404. The video trimming module 404 may be configured to classify the respective video clips 204 as being associated with respective types of intersection configurations. In one embodiment, the video trimming module 404 may access the memory 126 of the external server 120 to store the respective video clips 204. As discussed below, the stored video clips 204 may be associated with combinations of actions unit that are annotated and retrieved based on a query 216 of the annotated action units and presented to the user 210 as intersection scenario video clips 212.

With continued reference to FIG. 5, the method 500 may proceed to block 506, wherein the method 500 may include annotating action units associated with the intersection scenes 302. In an exemplary embodiment, upon storing the video clips 204 upon the memory 126 of the external server 120, the video trimming module 404 may communicate respective data pertaining to the storage of the video clips 204 to the action unit annotation module 406 of the intersection scenario application 104. In one embodiment, the action unit annotation module 406 may be configured to retrieve the respective video clips 204 from the memory 126 and may communicate with the dynamic sensors 116 to retrieve stored dynamic data associated with the dynamic operation of the ego vehicle 102 that is captured at concurrent time stamps as the respective video clips 204.

Figure 6:
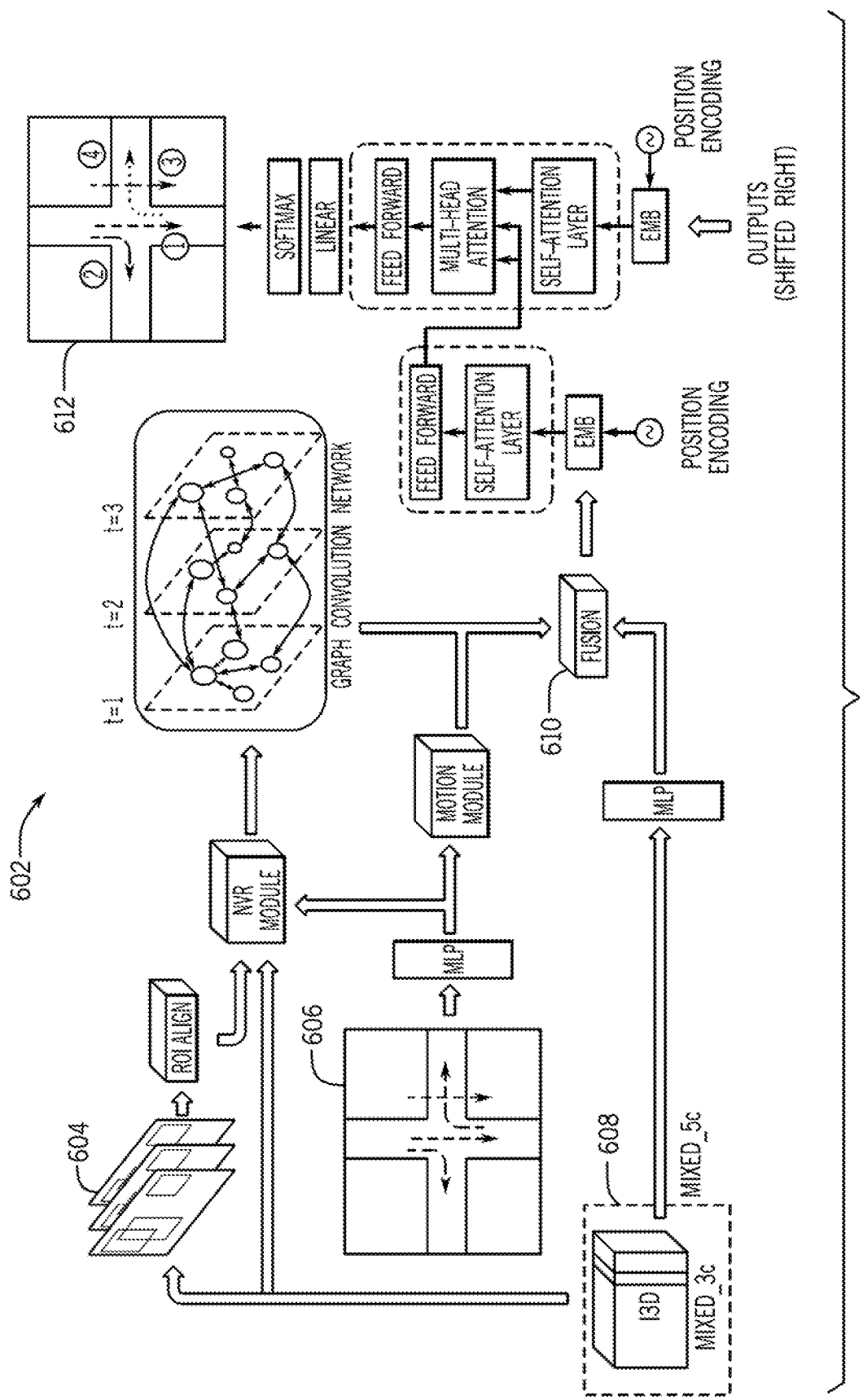
FIG. 6 is an illustrative framework for annotating action units associated with intersection scenes according to an exemplary embodiment of the present disclosure.

The action unit annotation module 406 may be configured to communicate with the neural network 108 to analyze each respective video clip 204 and the dynamic data associated with the dynamic operation of the ego vehicle 102 that is captured at concurrent time stamps as the respective video clip 204. With reference to FIG. 6, a framework 602 utilized by the neural network 108 to annotate action units associated with the intersection scenes 302, the neural network 108 may be able to analyze video clips 204 inputted by the action unit annotation module 406. In one embodiment, for each intersection scene 302, the neural network 108 may be configured to localize the dynamic objects location within the intersection scene 302. The neural network 108 may compute respective object bounding boxes 604 around each of the dynamic objects in order to localize the positions of the dynamic objects located within the intersection scene 302. Additionally, the neural network 108 may be configured to classify each of the dynamic objects as cars, pedestrians, and/or cyclists. In one configuration, the neural network 108 may further utilize the graph convolutional layer to analyze vector values to thereby output a positional relationship between the ego vehicle 102 and additional dynamic objects located within the intersections scene 302 with respect to one another.

In one embodiment, the neural network 108 may further be configured to analyze the dynamic data associated with the dynamic operation of the ego vehicle 102 that is captured at concurrent time stamps as the respective video clip 204 as an input by the action unit annotation module 406. The neural network 108 may be further configured to analyze positional differences of the dynamic objects located within the intersection scene 302 as the ego vehicle 102 and the dynamic objects approach, enter, pass through, and exit the intersection scene 302. The neural network 108 may be configured to process a three-dimensional positional representation 606 of a motion path of the ego vehicle 102 and the respective motion paths of each of the dynamic objects traveling within the intersection scene 302.

In one or more embodiments, the neural network 108 may additionally be configured to analyze the respective video clip 204 and implicitly determine a global context 608 of the intersection scene 302 using an I3D model. The global context 608 may be associated with the layout of the intersection scene 302, one or more static objects that may be located within the intersection scene 302, one or more markings (e.g., lane markings, cross walks) of the roadways included within the intersection scene 302, and the like. In other words, the global context 608 of the intersection scene 302 may be attributed to portions of the intersection scene 302 that may not be included within the object bounding boxes 604 computed by the neural network 108.

In an exemplary embodiment, the neural network 108 may be configured to fuse 610 the positions and classifications of the dynamic objects with respect to the position of the ego vehicle 102 as output by the graph convolution network with the motion paths of the ego vehicle 102 and the respective three-dimensional motion paths of each of the dynamic objects traveling within the intersection scene 302 with the global context 608 of the intersection scene 302 to determine fused spatial data associated with the intersection scene 302. The fused spatial data includes a three-dimensional representation of the intersection scene 302 that captures spatial information. The neural network 108 may thereby be configured to analyze the fused spatial data using numerous convolutional layers for position encoding and providing outputs to determine action unit nouns that are associated with the ego vehicle 102 and the dynamic objects included within the image scene such as a car, a group of cars, a pedestrian, a group of pedestrians, a cyclist, a group of cyclists.

The neural network 108 may additionally be configured to analyze the global context 608 of the intersection scene 302 and the motion path of the ego vehicle 102 and the respective motion paths of each of the dynamic objects traveling within the intersection scene to thereby determine action unit verbs that are associated with the respective motion paths of the ego vehicle 102 and the dynamic objects included within the intersection scene. In one configuration, the neural network 108 may combine the action unit noun (e.g., E) and the action unit verbs associated with the ego vehicle 102 and its motion path within the intersection scene 302. The neural network 108 may further combine the action unit nouns and the action unit verbs associated with the respective dynamic objects and their respective motion paths within the intersection scene 302. Upon combining the action units associated with the ego vehicle 102 and each of the dynamic objects traveling within the intersection scene 302, the neural network 108 may output the action unit combinations to the action unit annotation module 406.

Referring again to the method 500 of FIG. 5, the method 500 may proceed to block 508, wherein the method 500 may include storing the action unit combinations upon the intersection scenario database 106. In an exemplary embodiment, upon receiving the action unit combinations associated with the ego vehicle 102 and the dynamic objects included within each of the intersection scenes, the action unit annotation module 406 may be configured to access the intersection scenario database 106. The action unit annotation module 406 may be configured to create a respective data record within a field that pertains to the type of intersection configuration as the intersection scene 302.

The data record may be populated with annotated action units as intersection scenarios. The data record may additionally be populated with a data tag that links the annotated action units to one or more stored video clips 204 of the respective intersection scene 302 that include the dynamic objects and motion paths described by the annotated action units upon the memory 126 of the external server 120.

Accordingly, the action unit annotation module 406 may populate the intersection scenario database 106 with respective intersection scenarios that may include one or more action unit combinations that are associated with respective intersection scenes 302 through linked video clips 204 stored on the memory 126 of the external server 120.

The method 500 may proceed to block 510, wherein the method 500 may include retrieving an intersection scenario based on a query of the annotated action units. In an exemplary embodiment, the intersection scenario application 104 may be configured to allow the user 210 to initiate the search mode of the application 104 through a respective graphical user interface of the application 104. The search mode may enable the application 104 to control the presentation of an intersection scenario retrieval user interface that may be utilized by the user 210 to view one or more intersection scenario video clips 212 that are associated with a particular intersection scenario based on input of object and motion search inputs 214 that are provided by the user 210.

Figure 7:
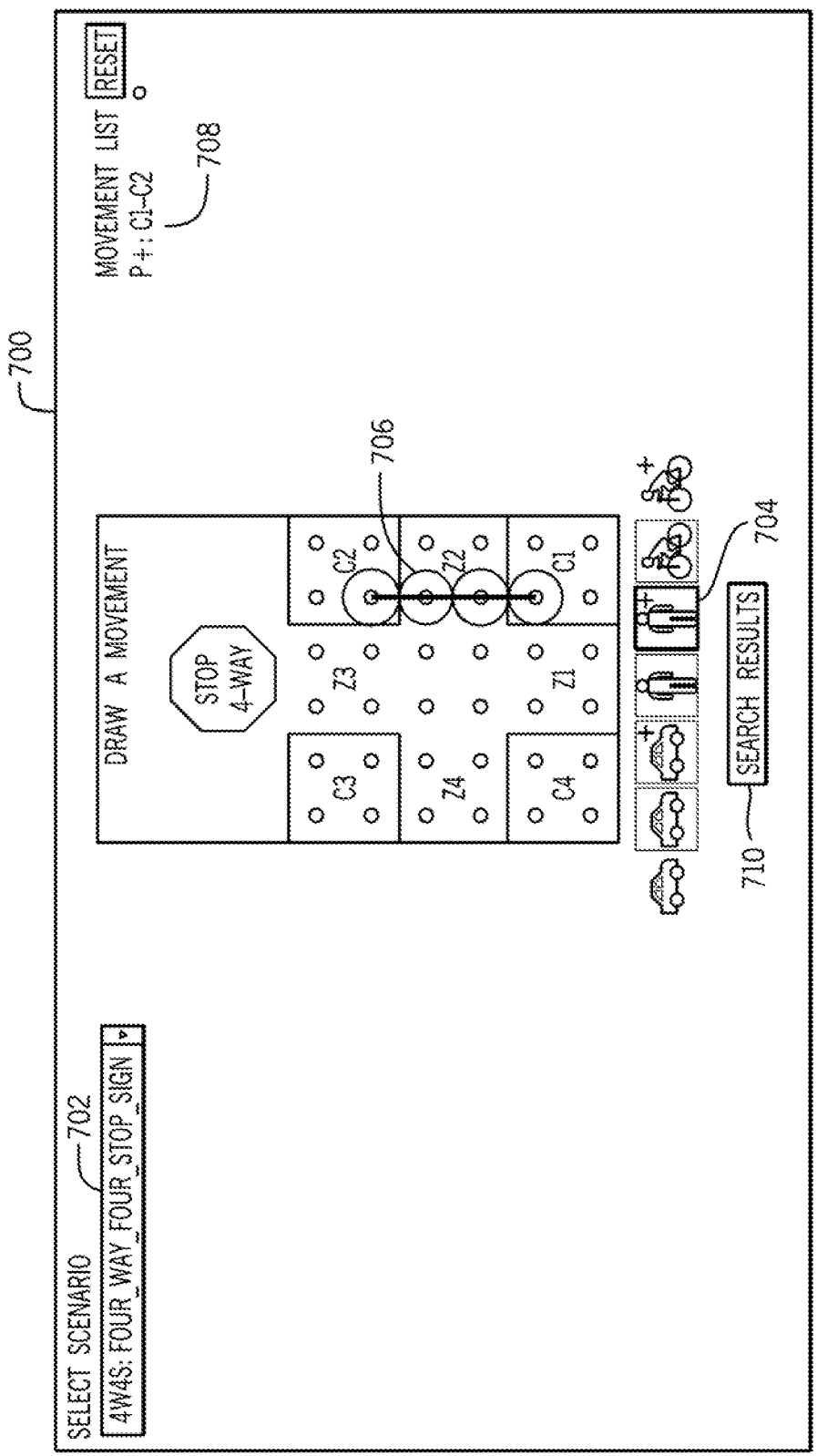
FIG. 7 is an illustrative example of the intersection scenario retrieval user interface of the intersection scenario application according to an exemplary embodiment of the present disclosure.

FIG. 7 is an illustrative example of the intersection scenario retrieval user interface 700 of the intersection scenario application 104 according to an exemplary embodiment of the present disclosure. In one configuration, one or more electronic display screens may be electronically controlled by the intersection scenario application 104 to present the intersection scenario retrieval user interface 700 as a human machine interface of the application 104 to be utilized by the user 210. As shown in the illustrative example of FIG. 7, the intersection scenario retrieval user interface 700 may include an intersection configuration drop down menu 702 that may enable the user 210 to select a type of intersection configuration (e.g., four way intersection, three way intersection, etc.) of the intersection scenario the user 210 would like to view. In other words, the intersection configuration drop down menu 702 may allow the user 210 to view particular intersection scenario video clips 212 that include a specific type of intersection configuration.

The intersection scenario retrieval user interface 700 may additionally include dynamic object selection input icons 704 that may pertain to the types of dynamic objects that the user 210 may select as being included within the intersection scenario video clips 212 that may be presented to the user 210. As shown, the dynamic object selection input icons 704 may include icons that may be selected to present intersection scenario video clips 212 with egocentric views of intersection scenes 302 that include dynamic objects such as a car, a group of cars, a pedestrian, a group of pedestrians, a cycle, and/or a group of cycles.

Additionally, the intersection scenario retrieval user interface 700 may include a selectable intersection grid 706 that may be utilized by the user 210 to select one or more types of motion paths that may be associated with the ego vehicle 102 and/or one or more dynamic objects selected based on the input of one or more of the dynamic object selection input icons 704. In one configuration, the selectable intersection grid 706 may include input grid points that may be selected to provide a respective motion pattern that may be associated with each respective dynamic object. For example, as shown in the illustrative example of FIG. 7, the user 210 has selected the dynamic object selection input icons 704 and has inputted grid points (designated by circles) to formulate a motion path that may be associated with a selected group of pedestrians (P+) as an inputted dynamic object selection input icon.

As shown, the intersection scenario retrieval user interface 700 may include a scenario user interface graphic 708 that includes the selected inputs provided with respect to the input of object and motion search inputs 214 based on the inputted dynamic object selection input icons 704 and the selectable intersection grid 706. The scenario user interface graphic 708 presents the selected inputs in the video true traffic language as a combined action unit noun describing the group of pedestrians: P+ and the action unit verbs describing the selected motion path of the group of pedestrians: C1-C2.

In one embodiment, upon the input of a search results user interface input icon 710 presented on the intersection scenario retrieval user interface 700, the scenario retrieval module 408 may be configured to query the intersection scenario database 106 with the combined action units based on the user's input of object and motion search inputs 214 provided with respect to the intersection configuration drop down menu 702, the dynamic object selection input icons 704, and the selectable intersection grid 706. In other words, the scenario retrieval module 408 may be configured to query the intersection scenario database 106 to retrieve data records that include an intersection scenario that pertains to a type of intersection configuration, one or more particular dynamic objects that are included within the intersection scene 302 pertaining to the type of the intersection configuration, and respective motion paths of the ego vehicle 102 and/or the one or more particular dynamic objects included within the intersection scene 302, as selected by the user's input of object and motion search inputs 214.

In an exemplary embodiment, upon querying the intersection scenario database 106 with the action unit combinations based on the user's selected inputs, the scenario retrieval module 408 may be configured to retrieve data records that pertain to intersection scenarios that are described by the action unit combinations. Such data records may be included within a particular field that is associated with the selected type of intersection configuration (based on the user's selection of the intersection configuration drop down menu 702) and may include a data tag that links the annotated action units to one or more stored video clips 204 of the respective intersection scene 302.

The scenario retrieval module 408 may thereby access the memory 126 of the external server 120 to retrieve the one or more stored video clips 204 and may operably control the intersection scenario retrieval user interface 700 to present a video playback player to electronically control one or more display screens to present the stored video clips 204 as intersection scenario video clips 212 that are associated with the particular intersection scenario based on input of object and motion search inputs 214 that are provided by the user 210.

Figure 8:
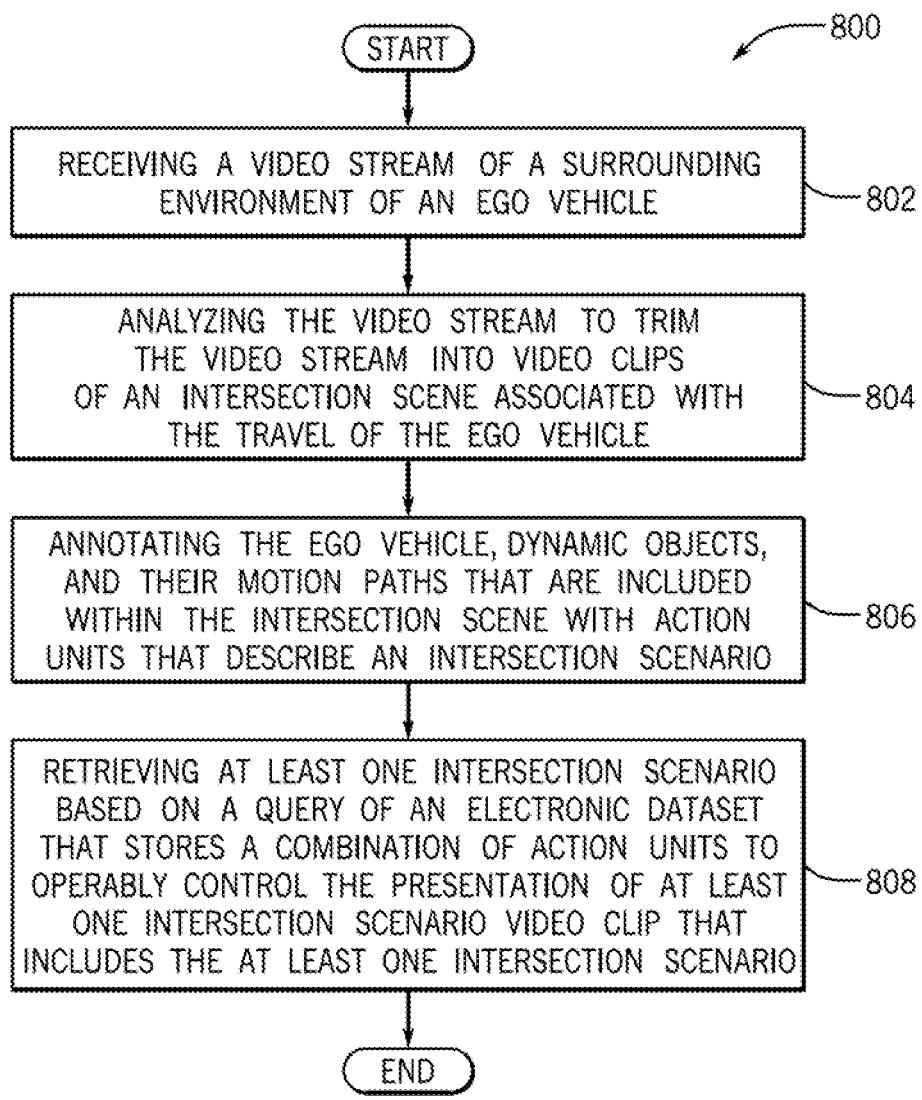
FIG. 8 is a process flow diagram of a method for performing intersection scenario retrieval according to an exemplary embodiment of the present disclosure.

FIG. 8 is a process flow diagram of a method 800 for performing intersection scenario retrieval according to an exemplary embodiment of the present disclosure. FIG. 8 will be described with reference to the components of FIG. 1-FIG. 4, though it is to be appreciated that the method 800 of FIG. 8 may be used with additional and/or alternative system components. The method 800 may begin at block 802, wherein the method 800 may include receiving a video stream 202 of a surrounding environment of an ego vehicle 102.

The method 800 may proceed to block 804, wherein the method 800 may include analyzing the video stream 202 to trim the video stream into video clips 204 of an intersection scene 302 associated with the travel of the ego vehicle 102. The method 800 may proceed to block 806, wherein the method 800 may include annotating the ego vehicle 102, dynamic objects, and their motion paths that are included within the intersection scene 302 with action units that describe an intersection scenario.

In one embodiment, the action units include action unit nouns that describe the ego vehicle 102 and the dynamic objects and action unit verbs that describe respective motion paths of the ego vehicle 102 and the dynamic objects within the intersection scenes 302. The method 800 may proceed to block 808, wherein the method 800 may include retrieving at least one intersection scenario based on a query of an electronic dataset that stores a combination of action units to operably control a presentation of at least one intersection scenario video clip that includes the at least one intersection scenario.

It should be apparent from the foregoing description that various exemplary embodiments of the invention may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for performing intersection scenario retrieval comprising:
   receiving a video stream of a surrounding environment of an ego vehicle;
   analyzing the video stream to trim the video stream into video clips of an intersection scene associated with travel of the ego vehicle;
   analyzing a three-dimensional representation of the intersection scene to capture spatial information;
   annotating the ego vehicle, dynamic objects, and their motion paths that are included within the intersection scene with action units that describe an intersection scenario based on the spatial information for position encoding, wherein the action units include action unit nouns that describe the ego vehicle and the dynamic objects and action unit verbs that describe respective motion paths of the ego vehicle and the dynamic objects within the intersection scene; and
   retrieving at least one intersection scenario based on a query of an electronic dataset that stores a combination of action units to operably control a presentation of at least one intersection scenario video clip that includes the at least one intersection scenario.

2. The computer-implemented method of claim 1, wherein receiving the video stream includes receiving the video stream that includes an egocentric view of the surrounding environment of the ego vehicle as the ego vehicle is traveling, wherein the egocentric view is captured during a predetermined timeframe.

3. The computer-implemented method of claim 1, wherein analyzing the video stream to trim the video stream includes analyzing the video stream to determine action priors that are associated with the dynamic objects and their respective motions as the ego vehicle approaches, enters, passes through, and exits the intersection scene.

4. The computer-implemented method of claim 1, wherein annotating the ego vehicle, the dynamic objects, and their motion paths includes utilizing a neural network to analyze at least one video clip of each intersection scene to localize and classify the dynamic objects within the intersection scene.

5. The computer-implemented method of claim 4, wherein annotating the ego vehicle, the dynamic objects, and their motion paths includes utilizing the neural network to analyze a positional difference of the dynamic objects located within the intersection scene to process a three-dimensional positional representation of the motion paths, wherein the motion paths of the ego vehicle and the dynamic objects each pertain to a starting point and an ending point of each of the paths of travel of the ego vehicle and the dynamic objects within the intersection scene.

6. The computer-implemented method of claim 5, wherein annotating the ego vehicle, the dynamic objects, and their motion paths includes utilizing the neural network to determine a global context of the intersection scene, wherein the global context pertains to portions of the intersection scene that do not pertain to the dynamic objects.

7. The computer-implemented method of claim 6, wherein annotating the ego vehicle, the dynamic objects, and their motion paths includes fusing the positions and classifications of the dynamic objects with respect to a position of the ego vehicle with the motion paths of the ego vehicle and the dynamic objects and the global context of the intersection scene to output fused spatial data that includes the three-dimensional representation of the intersection scene that captures the spatial information.

8. The computer-implemented method of claim 7, wherein the fused spatial data is analyzed to determine the action unit nouns and the action unit verbs, wherein the action unit nouns pertaining to the ego vehicle and each of the dynamic objects are combined with the action unit verbs pertaining to the motion paths of the ego vehicle and the dynamic objects.

9. The computer-implemented method of claim 8, wherein the combination of action units are stored upon the electronic dataset and linked to the video clips of the intersection scene, wherein at least one video clips of the intersection scene is retrieved based on input of object and motion search inputs that are provided on an intersection scenario retrieval user interface to retrieve and present the at least one video clip as at least one intersection scenario video clip that include the at least one intersection scenario associated with the intersection scene.

10. A system for performing intersection scenario retrieval comprising:
a memory storing instructions when executed by a processor cause the processor to:
receive a video stream of a surrounding environment of an ego vehicle;
analyze the video stream to trim the video stream into video clips of an intersection scene associated with travel of the ego vehicle;
analyze a three-dimensional representation of the intersection scene to capture spatial information;
annotate the ego vehicle, dynamic objects, and their motion paths that are included within the intersection scene with action units that describe an intersection scenario based on the spatial information for position encoding, wherein the action units include action unit nouns that describe the ego vehicle and the dynamic objects and action unit verbs that describe respective motion paths of the ego vehicle and the dynamic objects within the intersection scene; and
retrieve at least one intersection scenario based on a query of an electronic dataset that stores a combination of action units to operably control a presentation of at least one intersection scenario video clip that includes the at least one intersection scenario.

11. The system of claim 10, wherein receiving the video stream includes receiving the video stream that includes an egocentric view of the surrounding environment of the ego vehicle as the ego vehicle is traveling, wherein the egocentric view is captured during a predetermined timeframe.

12. The system of claim 10, wherein analyzing the video stream to trim the video stream includes analyzing the video stream to determine action priors that are associated with the dynamic objects and their respective motions as the ego vehicle approaches, enters, passes through, and exits the intersection scene.

13. The system of claim 10, wherein annotating the ego vehicle, the dynamic objects, and their motion paths includes utilizing a neural network to analyze at least one video clip of each intersection scene to localize and classify the dynamic objects within the intersection scene.

14. The system of claim 13, wherein annotating the ego vehicle, the dynamic objects, and their motion paths includes utilizing the neural network to analyze a positional difference of the dynamic objects located within the intersection scene to process a three-dimensional positional representation of the motion paths, wherein the motion paths of the ego vehicle and the dynamic objects each pertain to a starting point and an ending point of each of the paths of travel of the ego vehicle and the dynamic objects within the intersection scene.

15. The system of claim 14, wherein annotating the ego vehicle, the dynamic objects, and their motion paths includes utilizing the neural network to determine a global context of the intersection scene, wherein the global context pertains to portions of the intersection scene that do not pertain to the dynamic objects.

16. The system of claim 15, wherein annotating the ego vehicle, the dynamic objects, and their motion paths includes fusing the positions and classifications of the dynamic objects with respect to a position of the ego vehicle with the motion paths of the ego vehicle and the dynamic objects and the global context of the intersection scene to output fused spatial data that includes the three-dimensional representation of the intersection scene that captures the spatial information.

17. The system of claim 16, wherein the fused spatial data is analyzed to determine the action unit nouns and the action unit verbs, wherein the action unit nouns pertaining to the ego vehicle and each of the dynamic objects are combined with the action unit verbs pertaining to the motion paths of the ego vehicle and the dynamic objects.

18. The system of claim 17, wherein the combination of action units are stored upon the electronic dataset and linked to the video clips of the intersection scene, wherein at least one video clips of the intersection scene is retrieved based on input of object and motion search inputs that are provided on an intersection scenario retrieval user interface to retrieve and present the at least one video clip as at least one intersection scenario video clip that include the at least one intersection scenario associated with the intersection scene.

19. A non-transitory computer readable storage medium storing instructions that when executed by a computer, which includes a processor perform a method, the method comprising:
receiving a video stream of a surrounding environment of an ego vehicle;
analyzing the video stream to trim the video stream into video clips of an intersection scene associated with travel of the ego vehicle;
analyzing a three-dimensional representation of the intersection scene to capture spatial information;

annotating the ego vehicle, dynamic objects, and their motion paths that are included within the intersection scene with action units that describe an intersection scenario based on the spatial information for position encoding, wherein the action units include action unit nouns that describe the ego vehicle and the dynamic objects and action unit verbs that describe respective motion paths of the ego vehicle and the dynamic objects within the intersection scene; and retrieving at least one intersection scenario based on a query of an electronic dataset that stores a combination of action units to operably control a presentation of at least one intersection scenario video clip that includes the at least one intersection scenario.

20. The non-transitory computer readable storage medium of claim 19, wherein the combination of action units are stored upon the electronic dataset and linked to the video clips of the intersection scene, wherein at least one video clips of the intersection scene is retrieved based on input of object and motion search inputs that are provided on an intersection scenario retrieval user interface to retrieve and present the at least one video clip as at least one intersection scenario video clip that include the at least one intersection scenario associated with the intersection scene.

* * * * *